Figure 1:
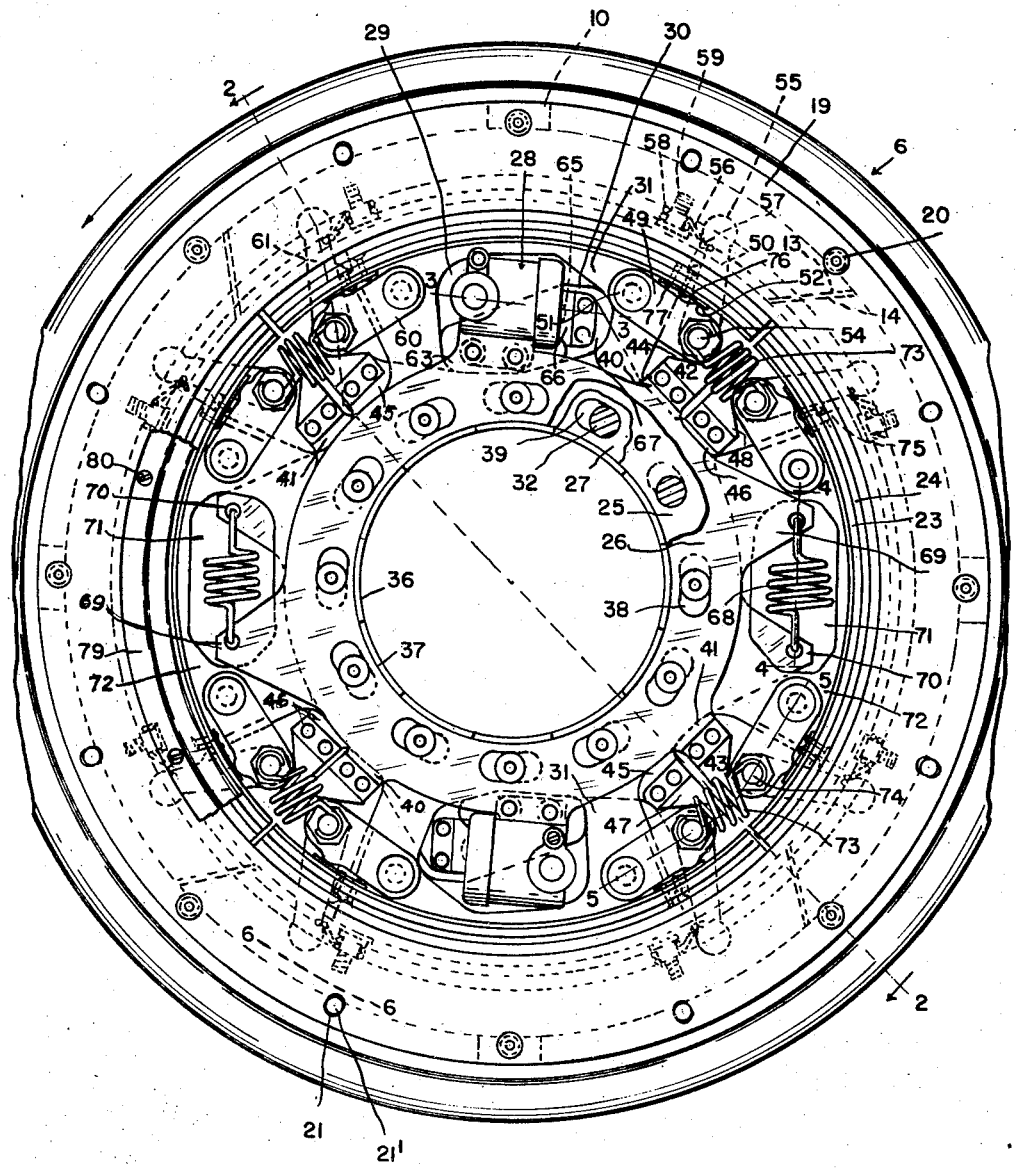

March 21, 1944.   P. M. FREER   2,344,691
BRAKE
Filed Aug. 7, 1942   2 Sheets-Sheet 1

FIG.I.

INVENTOR.
PHELPS M. FREER
BY
ATTORNEYS

March 21, 1944.    P. M. FREER    2,344,691
BRAKE
Filed Aug. 7, 1942    2 Sheets-Sheet 2
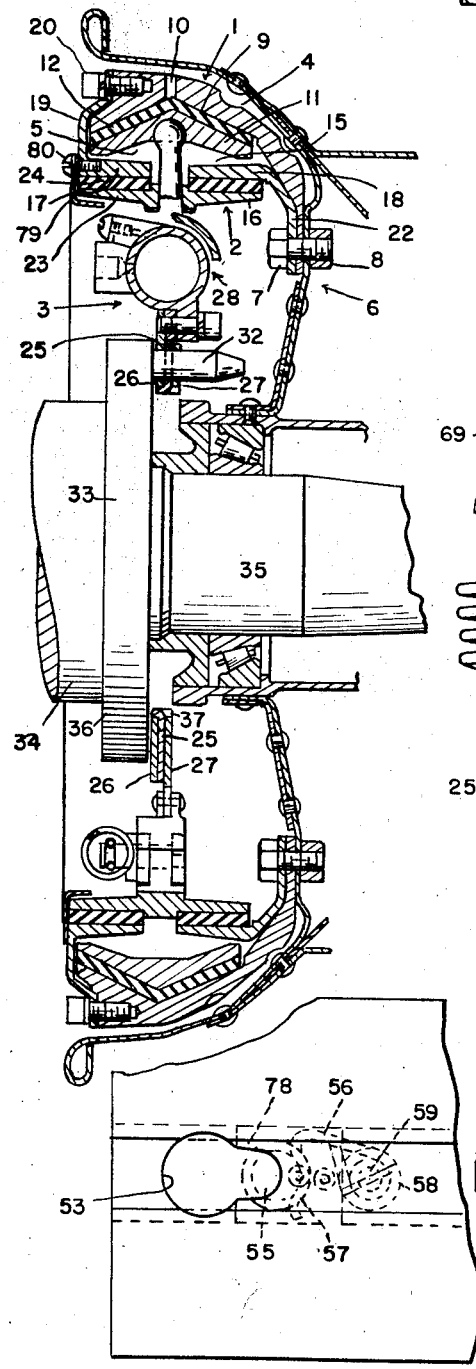
FIG. 2.
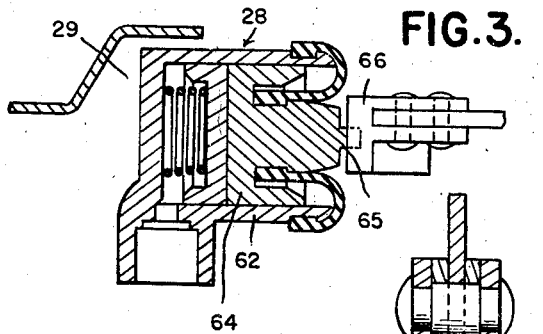
FIG. 3.
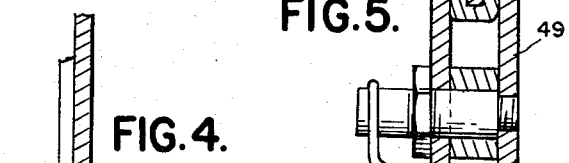
FIG. 4.
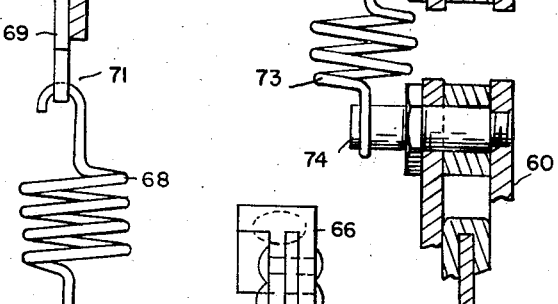
FIG. 5.
FIG. 7.
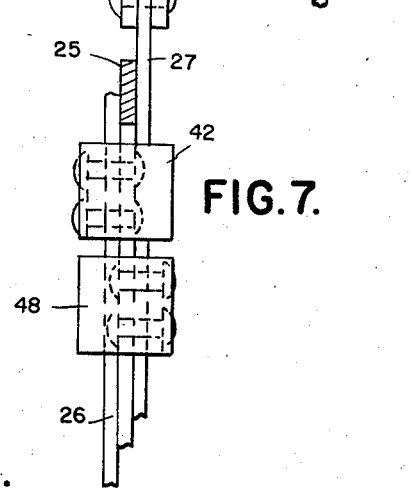
FIG. 6.
INVENTOR.
PHELPS M. FREER
BY
ATTORNEYS Patented Mar. 21, 1944

2,344,691

UNITED STATES PATENT OFFICE 2,344,691

BRAKE

Phelps M. Freer, Detroit, Mich.

Application August 7, 1942, Serial No. 454,027

5 Claims. (Cl. 188—78)

The invention relates to brakes and refers more particularly to brakes comprising a plurality of sets of relatively rotatable friction members.

The invention has for one of its objects to provide a brake comprising a plurality of sets of relatively rotatable friction members in which the relatively rotatable friction members of each set are moved into engagement independently of the relatively rotatable friction members of another set by actuating mechanism comprising an actuating member common to the sets.

The invention has for another object to provide an actuating mechanism which is constructed to exert a different force upon the relatively rotatable friction members of the sets so that each set can perform a predetermined amount of braking.

The invention has for a further object to provide an actuating mechanism which is constructed to exert a yieldable force upon the relatively rotatable friction members of one set to avoid the necessity of holding the parts to very close tolerances.

The invention has for other objects to form a brake having concentric brake drums and brake shoes engageable with the drums and actuating mechanism all so constructed and arranged to secure a very compact and powerful brake; to arrange the actuating mechanism and the shoes engageable with one drum so that the shoes are adapted to anchor on the actuating mechanism; and to so arrange the parts that the shoes engageable with one drum abut and transmit their wrapping force to the portion of the actuating mechanism for applying the shoes engageable with another drum.

With these as well as other objects in view, the invention resides in the novel features of construction and combinations and arrangements of parts as more fully hereinafter set forth.

In the drawings:

Figure 1 is an inboard elevation, with parts broken away, of a brake embodying the invention;

Figures 2, 3, 4, 5 and 6 are cross sections on the lines 2—2, 3—3, 4—4, 5—5 and 6—6, respectively, of Figure 1;

Figure 7 is an edge view of a portion of the actuating mechanism omitting the linkage.

The brake, as illustrated in the present instance, is designed for use with an airplane landing wheel, although it is apparent that it may be otherwise used as with motor vehicles and the like. The brake comprises the outer and inner sets 1 and 2 of relatively rotatable friction members and the actuating mechanism 3.

The outer set 1 comprises the rotatable friction member 4 and the non-rotatable friction member 5. The rotatable friction member 4 is a brake drum having its web or back secured to the airplane landing wheel 6 by means of the bolts 7 and the nuts 8. The brake drum has a V-shaped internal friction face with the side portions 9 converging radially outwardly toward the middle of the friction face. The brake drum is preferably provided with the radial openings 10 therethrough leading to the apex of the V-shaped friction face and providing for the escape of lining dust. The non-rotatable friction member 5 comprises the annular series of brake shoes 11 having secured to their radially outer faces the brake lining 12 which is V-shaped and complemental to the friction face of the brake drum. For the purpose of securing substantially 360° contact between the brake shoes and the brake drum and at the same time enabling assembly of the brake shoes within the brake drum, the ends of the brake shoes are correspondingly beveled, as indicated at 13 and 14, so that the last brake shoe to be assembled within the brake drum can be moved in a generally endwise direction into place, at which time the beveled ends 14 of the brake shoes are located radially outwardly of and overlap the beveled ends 13 of the adjacent brake shoes.

The inner set 2 comprises the rotatable friction member 15 and the non-rotatable friction member 16. The rotatable friction member is a brake drum within and concentric with the brake drum 4 and it is formed of the inboard section 17 and the outboard section 18 having aligned internal friction faces. The inboard section is preferably integral with the plate 19 which extends generally radially outwardly at the inboard side of the brake drum 4 and brake shoes 11 and is concentrically secured to the brake drum by the bolts 20. To secure concentricity of the brake drum 4 and inboard section 17 and to provide for expansion and contraction of the brake drum without moving the inboard section, the plate is provided with the radially elongated holes 21 for receiving the dowels 21' upon the brake drum 4. The holes in the plate through which the bolts 20 extend are larger than the bolts to permit the relative expansion and contraction. The outboard section 18 has a web or back 22 secured to the airplane landing wheel preferably by the same bolts and nuts used in securing the web or back of the brake drum 4. The inboard and outboard sections of the inner brake drum are spaced from each other a distance to provide for the insertion therebetween of the portion of the actuating mechanism for forcing the brake shoes 11 into engagement with the brake drum 4. The friction member 16 comprises the annular series of brake shoes 23 having secured to their radially outer faces the brake lining 24 for engaging the internal friction face of the inboard and outboard sections forming the inner brake drum 15. It will be noted that there is the same number of brake shoes 23 as there are brake shoes 11 and also that the ends of the brake shoes 23 are closely adjacent and parallel to the radius which passes through the beveled ends of the brake shoes 11 substantially midway of their radially outer and radially inner faces.

The actuating mechanism 3 comprises the anchor disc 25, the inboard and outboard actuating discs 26 and 27, respectively, at opposite sides of the anchor disc, and linkage anchored to the anchor disc and operatively connected to the outer and inner brake shoes and the actuating discs. The actuating mechanism also comprises the diametrically opposite actuating members 28 which are in the nature of wheel cylinders and which are located in the pockets 29 and the openings 30 formed in the diametrically opposite radial projections 31 of the anchor disc 25. The anchor disc has a sliding fit on the axial pins 32 which extend in an outboard direction from the flange 33 of the support 34 having the shaft 35 on which is journaled the wheel 6. The actuating discs 26 and 27 are centered with respect to the anchor disc by the ears 36 and 37 which alternate and are bent to extend axially in inboard and outboard directions into central holes formed in the actuating discs. The actuating discs 26 and 27 are sleeved upon the pins 32 and are provided with the arcuate openings 38 and 39, respectively, through which the pins extend to permit relative angular movement of the actuating discs in opposite directions. The inboard actuating disc 26 is angularly movable from its off position in a counterclockwise direction, viewed in Figure 1, to apply the brake, while the outboard actuating disc 27 is angularly movable in a clockwise direction, viewed in Figure 1, to apply the brake.

The inboard actuating disc has the pairs of diametrically opposite radial projections 40 and 41 to which are fixedly secured the cams 42 and 43, respectively. The cams are furcated to embrace the projections and the cams are secured to the projections by suitable means, such as rivets, which extend through the furcations and the projections. The cams have the cam faces 44 which face generally radially outwardly. The outboard actuating disc 27 is also formed with the pairs of diametrically opposite radial projections 45 and 46 to which are fixedly secured the cams 47 and 48, respectively. These cams are formed in the same manner as the cams 42 and 43. The outboard actuating disc is arranged reverse to the inboard actuating disc and the cams of the actuating discs are arranged in pairs spaced 90° apart with the cam on one actuating disc adjacent to and substantially aligned with and facing in divergent relation to a cam on the other actuating disc.

The linkage for each of the outer brake shoes 11 and inner brake shoes 23 occupying the same arc is the same and, therefore, that for the upper brake shoes will be described. There are two pairs of pivotally connected links with one pair operatively connected to the brake shoes near one end and adapted to be actuated by a cam on the inboard actuating disc and with the other pair operatively connected to the brake shoes near the opposite end and adapted to be actuated by a cam on the outboard actuating disc. In detail, 49 and 50 is one pair of links with the link 49 pivotally connected at one end by the pin 51 to the radial projection 31 of the anchor disc and with the other end in contact with the cam face 44 of the cam 42 upon the inboard actuating disc 26. The link 49 extends in a chordwise direction inside the inner brake shoe 23 and is provided intermediate its ends with the boss 52 for actuating the right hand end of the brake shoe. The link 50 is a compression link extending through the key hole opening 53 in the inner brake shoe and pivotally connected at one end by the pin 54 to the free end of the link 49 and operatively connected to the right hand end of the outer brake shoe by the ball-shaped end 55 integral with the link and engaging an approximately hemi-spherically shaped socket in the outer brake shoe. The ball-shaped end is held in the socket by the spring 56 having the transverse end portion 57 engaging the inner part of the ball-shaped end and having the coils 58 through which the screw 59 extends for securing the spring to the radially inner face of the outer shoe. 60 and 61 are the links of the other pair and these links are constructed and arranged in the same manner as the links 49 and 50. However, the link 60 is engageable with the cam face of the cam 47 upon the outboard actuating disc 27 and the link 61 is operatively connected to the left hand end of the outer shoe. The arrangement of the pairs of links is such that when the actuating discs are angularly moved by the wheel cylinders the links 49 and 60 operate upon the ends of the inner brake shoe to move the same generally radially outwardly into engagement with the inner brake drum and the links 50 and 61 operate upon the ends of the outer brake shoe to move the same into engagement with the outer brake drum. Furthermore, the links 49 and 60 exert a force on the inner brake shoe greater than that exerted by the links 50 and 61 on the outer brake shoe by reason of the bosses on the former links being located between their ends. It will be noted that the links 50 and 61 are in opposed relation and serve to hold the outer brake shoe from rotation when forced into engagement with the outer brake drum when the latter is rotating.

For the purpose of anchoring the inner brake shoes and also utilizing the wrapping force resulting from their engagement with the inner brake drum, the small ends of their key-hole openings 53 are engageable with the compression links 50 and 61, according to the direction of rotation of the brake drums. It will be seen that with the brake drums rotating in the direction of the arrow in Figure 1, the upper inner brake shoe abuts the link 61 when the brake is applied tending to swing the latter link in a counterclockwise direction, thereby more firmly engaging the left hand end of the upper outer brake shoe with the outer brake drum. Since the wheel cylinders 28, as more fully hereinafter described, are mounted on the actuating discs, it will be seen that the inboard actuating disc will function to move the right hand end of the upper outer brake shoe tightly into engagement with the outer brake drum.

Each of the wheel cylinders 28 comprises the cylinder 62 fixed to a radial projection 63 upon the inboard actuating disc 26 and the piston 64 slidable within the cylinder and having its rod 65 engaging the abutment 66 which is fixedly secured to the radial projection 67 upon the outboard actuating disc 27. The radial projection 67 registers with the associated opening 30.

To normally hold the parts in their off positions, at which time they will be as shown in Figure 1, there are the diametrically opposite coil springs 68 connected to the radial projections 69 and 70, respectively, on the inboard and outboard actuating discs 26 and 27. The springs extend within the openings 71 in the radial projections 72 on the anchor disc 25. It will be noted that certain of the links 49 and 60 are pivoted to the radial projections 31 on the anchor disc and that the other of the links 49 and 60 are pivoted to the radial projections 72 on the anchor disc.

To return the brake shoes to their off positions and also to hold the linkages in operative relation to the cams for operating the same, I have provided the coil springs 73 which are connected at their ends to the extensions 74 of the pins pivotally connecting the links of each pair. The links 50 and 61 are also provided with the lateral projections 75 located radially outwardly of the inner brake shoes and adapted to contact therewith for moving the inner brake shoes to off position.

The inner brake shoes 23 during the inital part of the application of the brake are yieldably urged into engagement with the inner brake drum by the springs 76 which are secured at one end to the radially inner faces of the brake shoes and which have flexible portions at the other end engaging the bosses 52. It will be noted that the springs 76, as shown, are secured to the inner faces of the inner brake shoes by the rivets 77 and that their flexible portions 78 are bifurcated to straddle the adjacent compression link and engage the bosses 52. During the application of the brake the springs 76 first force the inner brake shoes into engagement with the inner brake drum and then flex until they form a solid spacer between the inner brake shoes and the link bosses, after which the inner brake shoes are moved positively. With this construction, the necessity of holding the parts to very close tolerances is avoided. In the brake illustrated the clearance between the outer brake drum and the outer brake shoes when in off position is .012" to .014". The clearance between the inner brake drum and the inner brake shoes when in off position is .006" to .008" and the clearance between the inner brake shoes and the flexible portion of the actuating spring is .006" to .008".

79 is a shield at the inboard side of the inner brake drum and the inner brake shoes which is secured by the screws 80 to the inner brake drum.

In operation, with the parts in their off positions, as shown in Figure 1, the forcing of braking liquid under pressure into the wheel cylinders 28 causes the inboard actuating disc 26 to move in a counterclockwise direction and the outboard actuating disc 27 to move in a clockwise direction. As a result, the cams 42 and 43 of the inboard actuating disc and the cams 47 and 48 of the outboard actuating disc operate upon the pairs of links 49 and 50 and 60 and 61 to force the outer and inner brake shoes 11 and 23, respectively, generally radially outwardly into engagement with the brake drum. During the initial application the springs 76 yieldably force the inner brake shoes into engagement with the brake drum until the springs have flexed and become solid spacers, after which the inner brake shoes as well as the outer brake shoes are positively forced into engagement with their brake drums. During the application of the brake it will be seen that the inner brake shoes are anchored by the links used in forcing the outer brake shoes into engagement with the outer brake drum and also that the wrapping force of the inner brake shoes is used in more firmly applying the outer brake shoes. Upon release of pressure upon the braking liquid the parts are returned to their off positions by the coil springs 68 and 73 and the lateral projections 75 upon the links operatively connected to the outer brake shoes.

What I claim as my invention is:

1. A brake comprising brake drums, brake shoes engageable with the drums and actuating mechanism comprising an actuating member, links actuated at one end by said member and pivotally mounted at the other end and operatively connected intermediate their ends to the brake shoes engageable with one drum, and other links actuated at one end by said actuating member and operatively connected at the other end to the shoes engageable with another drum.

2. A brake comprising brake drums, brake shoes engageable with said drums and actuating mechanism comprising an actuating member, discs actuated by said member and having cams, an anchor disc, links actuated at one end by said cams and pivotally mounted at the other end upon said anchor disc and operatively connected intermediate their ends to the shoes engageable with one drum, and other links actuated at one end by said cams and operatively connected at the other end to shoes engageable with another drum, said first mentioned shoes being engageable with said other links to anchor upon the same.

3. A brake comprising concentric outer and inner brake drums, outer and inner brake shoes engageable with said drums, actuating discs movable angularly in opposite directions and provided with cams, an anchor disc, links actuated at one end by said cams and pivotally connected at the other end to said anchor disc and operatively connected intermediate their ends to said inner shoes and other links actuated at one end by said cams and operatively connected at the other end to said outer shoes, said outer links extending through said inner shoes.

4. A brake comprising brake drums, brake shoes engageable with said drums and actuating mechanism comprising an actuating member, discs actuated by said member and having cams, an anchor disc, links actuated at one end by said cams and pivotally mounted at the other end upon said anchor disc and operatively connected to the shoes engageable with one drum, and other links actuated at one end by said cams and operatively connected at the other end to shoes engageable with another drum.

5. A brake comprising inner and outer brake drums, inner and outer internal brake shoes engageable respectively with said inner and outer drums and actuating mechanism comprising an actuating member, and means actuated by said member for applying different forces upon said inner and outer shoes to move the same into engagement with said inner and outer drums respectively, the force applied on said inner shoes being greater than that applied on said outer shoes.

PHELPS M. FREER.